United States Patent [19]

Murachi

[11] Patent Number: 4,654,257
[45] Date of Patent: Mar. 31, 1987

[54] STRUCTURE FOR MOUNTING MOLDING

[75] Inventor: Tatsuya Murachi, Aichi, Japan

[73] Assignee: Toyoda Gosei Co., Ltd., Nishikasugai, Japan

[21] Appl. No.: 788,870

[22] Filed: Oct. 18, 1985

[30] Foreign Application Priority Data

Oct. 22, 1984 [JP] Japan ................................ 59-221430
Oct. 22, 1984 [JP] Japan ................................ 59-221431
Jan. 17, 1985 [JP] Japan .................................. 60-6492

[51] Int. Cl.⁴ ........................ B32B 7/12; B32B 25/08; B32B 25/16
[52] U.S. Cl. .................................. 428/317.1; 428/31; 428/317.7; 428/424.7; 428/519; 428/520
[58] Field of Search .................... 428/31, 304.4, 317.1, 428/317.7, 423.1, 424.7, 519, 520

[56] References Cited

U.S. PATENT DOCUMENTS

| | | | |
|---|---|---|---|
| 4,029,840 | 6/1977 | Shikinami et al. | 428/304.4 |
| 4,129,676 | 12/1978 | Guglielmo | 428/317.7 |
| 4,208,468 | 6/1980 | Cunningham et al. | 428/317.1 |
| 4,276,341 | 6/1981 | Tanaka | 428/317.1 |
| 4,592,937 | 6/1986 | Nagata et al. | 428/31 |

Primary Examiner—William J. Van Balen
Attorney, Agent, or Firm—Cushman, Darby & Cushman

[57] ABSTRACT

The present invention relates to a structure for mounting a molding. The structure for mounting a molding comprises a body to be mounted, a resin molding adhered to the body via a sponge, a primer coated between the resin molding and the sponge, the primer comprising a mixture of chloroprene rubber and a polymer of a methacrylic acid derivative and/or an acrylic acid derivative or a polymer of the monomer, and a finish coat applied onto the surface of the primer.

8 Claims, 2 Drawing Figures

STRUCTURE FOR MOUNTING MOLDING

BACKGROUND OF THE INVENTION

1. Field of the Invention

The present invention relates to a structure for mounting moldings fit up on the side of a body or a bumper of automobiles, or on the surface of other moldings, etc.

2. Description of the Related Technology

Bodies or bumpers of automobiles are equipped with moldings for decoration or protection. These moldings have been hitherto composed of synthetic resins such as polyvinyl chloride resin, etc. and possess the following mounting structure: that is, as shown in FIG. 2, double-coated tape 32 using an acryl adhesive is placed between molding 30 composed of polyvinyl chloride resin and body 31. The double-coated tape 32 comprises sponge 33 formed with acryl rubber in a thin plate and acryl adhesive 34 coated on its both surfaces.

In the thus constructed structure for mounting molding 30, molding 30 was sometimes stripped off at the interface with adhesive 34 by the following causes.

(1) Due to difference in temperature between the daytime and the nighttime or between the winter season and the summer season, molding 30 is contracted or expanded to cause stripping at the interface between molding 30 and adhesive 34.

(2) Low molecular weight compounds in molding 30 are evaporated off, bloomed or bleeded so that molding 30 is contracted to cause stripping at the interface between molding 30 and the aforesaid adhesive 34.

(3) Due to interaction between heat, light, water, etc., stabilizers, plasticizers, etc. in molding 30 are degraded to low molecular weight compounds by decomposition. The low molecular weight compounds evaporate off in the air so that molding 30 is contracted to cause stripping at the interface between molding 30 and the aforesaid adhesive 34.

SUMMARY OF THE INVENTION

An object of the present invention is to provide a structure for mounting molding which provides a markedly improved adhesive force of moldings to a body to be mounted greater than a stress due to expansion and contraction of moldings thereby to prevent moldings from being stripped off from the body.

In order to achieve the above-mentioned object, the structure for mounting moldings of the present invention comprises a body to be mounted, a resin molding to be adhered to the body via a sponge, a primer coated between the resin molding and the sponge, the primer comprising a mixture of chloroprene rubber and a polymer of a methacrylic acid derivative and/or an acrylic acid derivative or a polymer of said monomer, and a finish coat coated on the surface of the primer.

This and other objects of the present invention will be apparent from embodiments described hereinafter and claims appended. Many advantages that are not mentioned in the specification will be obvious to one skilled in the art if one practices the present invention.

DETAILED DESCRIPTION OF THE PREFERRED EMBODIMENTS

Figure 1:
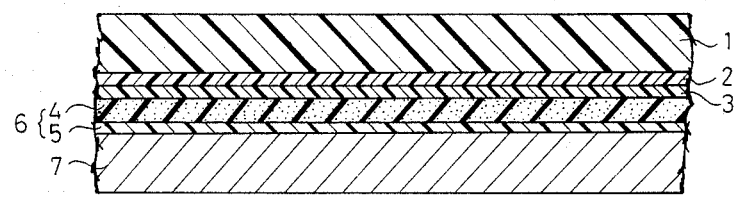
FIG. 1 is a partial cross section of an example of a specific structure for mounting a side protection molding of an automobile in accordance with the present invention.
Figure 2:
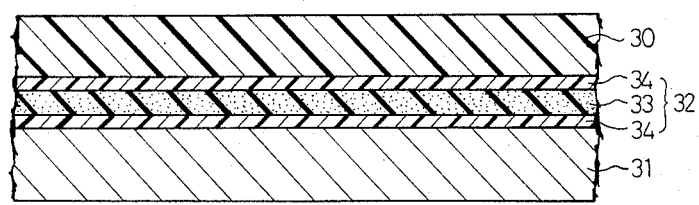
FIG. 2 is a partial cross section showing a conventional structure for mounting a molding.

Hereinafter the present invention will be explained with reference to FIG. 1 showing a specific structure for mounting a side protector molding (hereafter simply referred to as "molding") made of a synthetic resin onto a body of an automobile.

Primer 2 is applied onto the back surface of molding 1 and finish coat 3 is further applied on the surface of the primer 2.

On the surface of finish coat 3, sponge 4 formed with acryl rubber in a thin plate is placed. Acryl adhesive 5 is previously applied on the surface of sponge 4. This sponge 4 and acryl adhesive 5 consist of single-coated adhesive tape 6. Further, single-coated adhesive tape 6 is adhered to body 7 after it is adhered to molding 1.

The above-mentioned molding 1 is prepared by mixing and extrusion molding the following composition comprising the following parts by weight (hereafter simply referred to as "parts") at 170° C.

| Polyvinyl chloride ($\bar{P}$ = 1450) | 100 |
|---|---|
| DOP | 80 |
| Epoxylated soybean oil | 3 |
| Stabilizer | 4.5 |

The aforesaid primer 2 is obtained by polymerizing 100 parts of chloroprene rubber with 10 to 500 parts of the methacrylic acid derivative and/or the acrylic acid derivative. With greater than 500 parts, primer 2 becomes hard and rather fragile; with less than 10 parts, primer 2 cannot exhibit its effect and provides a poor adhesive force. Concretely, the primer is obtained by mixing the components in the following parts by weight.

| Chloroprene rubber | 100 |
|---|---|
| Ethyl acrylate | 100 |
| Toluene | 2425 |
| n-Hexane | 2425 |
| Benzoyl peroxide | 0.5 |

The mixture having the above composition is reacted at 80° C. for 8 hours to obtain primer 2.

Examples of the above-mentioned methacrylic acid derivatives include n-butyl methacrylate, methyl methacrylate, ethyl methacrylate, iso-butyl methacrylate, 2-ethylhexyl methacrylate, methacrylic acid, etc. Examples of the acrylic acid derivatives include, in addition to ethyl acrylate described above, acrylic acid, methyl acrylate, n-butyl acrylate, iso-butyl acrylate, 2-ethylhexyl acrylate, etc.

The above-mentioned finish coat 3 is obtained by mixing 100 parts of chloroprene rubber with 0.5 to 50 parts of a polyisocyanate. With greater than 50 parts, its adhesive force is rather reduced and a usable time period is shortened; with less than 0.5 parts, its adhesive force is not enhanced. Specifically, components are mixed in the following parts by weight.

| Chloroprene rubber | 100 |
|---|---|
| 4,4',4"-Triphenylmethane triisocyanate | 10 |
| Toluene | 150 |

-continued

| | |
|---|---|
| Methyl ethyl ketone | 150 |
| Methylene chloride | 40 |

Examples of the above-mentioned polyisocyanates include, in addition to 4,4',4''-triphenylmethane triisocyanate, tolylene diisocyanate, 4,4'-diphenylmethane diisocyanate, hydrogenated 4,4'-diphenylmethane diisocyanate, 1,5-naphthalene diisocyanate, xylene diisocyanate, hydrogenated xylene diisocyanate, isophorone diisocyanate, 1,6-hexamethylene diisocyanate, tris(p-isocyanato-phenyl)thiophosphate, etc.

Examples of organic solvents which are used for primer 2 and finish coat 3 described above include, in addition to n-hexane, toluene, methyl ethyl ketone and methylene chloride described above, benzene, xylene, cyclohexane, methyl isopropyl ketone, methyl isobutyl ketone, methyl acetate, ethyl acetate, isopropyl acetate, isobutyl acetate, etc.

The finish coat 3 may further contain phenol resins or organic acids as hardeners or stabilizers.

Examples of the phenol resins include Tamanol 520S, Tamanol 521, Tamanol 526, Tamanol 573S, Tamanol 586, etc. Examples of terepene phenol resins include Tamanol 803, etc. Examples of rosin-modified phenols include Tamanol 135, Tamanol 340, Tamanol 350, etc. Tamanol is a trademark of Arakawa Chemical Industry Co., Ltd.

Examples of the organic acids include formic acid, acetic acid, propionic acid, fumaric acid, maleic acid, maleic anhydride, citraconic acid, itaconic acid, etc.

In order to confirm the effect of the example, the following test was performed. That is, primer 2 was applied to test pieces comprising the same compound as molding 1 described above. After air-drying the test pieces at room temperature for 30 minutes, finish coat 3 was coated thereon followed by air-drying at room temperature for 30 minutes likewise. The test pieces were laminated on each other. After allowing to stand at room temperature for 3 days, a shearing test was performed at a tensile speed of 30 mm/min. The above test was performed in combinations shown in Table 1 using primers A to E and finish coats F to N having compositions described hereinafter. The results are shown in Table 1.

TABLE 1

| | Primer | Finish Coat | Shear Strength (kg/18 mm$^2$) |
|---|---|---|---|
| Example 1 | described above | described above | 23.0 |
| Example 2 | A | F | 18.1 |
| Example 3 | B | F | 21.6 |
| Example 4 | A | G | 20.5 |
| Example 5 | A | H | 17.9 |
| Example 6 | C | J | 16.0 |
| Example 7 | C | K | 21.0 |
| Example 8 | C | M | 18.0 |
| Example 9 | C | N | 22.0 |
| Example 10 | D | N | 22.5 |
| Comparative Example 1 | C | I | 7.6 |
| Comparative Example 2 | E | I | 7.2 |
| Comparative Example 3 | E | J | 8.1 |
| Comparative Example 4 | E | K | 9.1 |
| Comparative Example 5 | E | L | 4.5 |
| Comparative Example 6 | C | L | 7.6 |
| Comparative Example 7 | D | L | 6.3 |
| Comparative Example 8 | | | 1.8 |

| Primer A: | |
|---|---|
| Chloroprene rubber | 100 |
| Methyl methacrylate | 50 |
| Toluene | 2425 |
| n-Hexane | 2425 |
| Benzoyl peroxide | 0.5 |

A mixture having the above composition was reacted at 80° C. for 8 hours to obtain primer A.

| Primer B: | |
|---|---|
| Chloroprene rubber | 100 |
| Methyl methacrylate | 300 |
| n-Butyl methacrylate | 200 |
| Toluene | 2875 |
| n-Hexane | 2425 |
| Benzoyl peroxide | 0.5 |

A mixture having the above composition was reacted at 80° C. for 8 hours to obtain primer B.

| Primer C: | |
|---|---|
| Chloroprene rubber | 100 |
| Methyl methacrylate | 100 |
| Benzoyl peroxide | 0.5 |
| Toluene | 2500 |
| n-Hexane | 2500 |

A mixture having the above composition was reacted at 80° C. for 8 hours to obtain primer C.

| Primer D: | |
|---|---|
| Chloroprene rubber | 100 |
| Ethyl methacrylate | 500 |
| Benzoyl peroxide | 0.5 |
| Toluene | 10000 |
| n-Hexane | 10000 |

A mixture having the above composition was reacted at 80° C. for 8 hours to obtain primer D.

| Primer E: | |
|---|---|
| Chloroprene rubber | 100 |
| Methyl acrylate | 300 |
| Ethyl acrylate | 300 |
| Benzoyl peroxide | 0.5 |
| Toluene | 10000 |
| n-Hexane | 10000 |

A mixture having the above composition was reacted at 80° C. for 8 hours to obtain primer E.

| Finish Coat F: | |
|---|---|
| Chloroprene rubber | 100 |
| 4,4',4''-Triphenylmethane | 10 |

| Finish Coat F: | |
|---|---|
| triisocyanate | |
| Toluene | 150 |
| Methyl ethyl ketone | 150 |
| Methylene chloride | 40 |

The above composition was mixed to obtain finish coat F.

| Finish Coat G: | |
|---|---|
| Chloroprene rubber | 100 |
| Tris(p-isocyanato-phenyl) thiophosphate | 20 |
| Toluene | 150 |
| Methyl ethyl ketone | 150 |
| Methylene chloride | 80 |

The above composition was mixed to obtain finish coat G.

| Finish Coat H: | |
|---|---|
| Chloroprene rubber | 100 |
| 4,4'-diphenylmethane diisocyanate | 10 |
| Toluene | 150 |
| Methyl ethyl ketone | 150 |
| Methylene chloride | 40 |

The above composition was mixed to obtain finish coat H.

| Finish Coat I: | |
|---|---|
| Chloroprene rubber | 100 |
| Toluene | 140 |
| Methyl ethyl ketone | 140 |

The above composition was mixed to obtain finish coat I.

| Finish Coat J: | |
|---|---|
| Chloroprene rubber | 100 |
| 4,4'-Diphenylmethane diisocyanate | 50 |
| Toluene | 210 |
| Methyl ethyl ketone | 210 |
| Phenol resin | 5 |

The above composition was mixed to obtain finish coat J.

Finish Coat K:

To the above-mentioned finish coat J were added 5 parts of acetic acid.

| Finish Coat L: | |
|---|---|
| Chloroprene rubber | 100 |
| 4,4'-Diphenylmethane diisocyanate | 60 |
| Toluene | 230 |
| Methyl ethyl ketone | 230 |

The above composition was mixed to obtain finish coat L.

| Finish Coat M: | |
|---|---|
| Chloroprene rubber | 100 |
| Xylene diisocyanate | 30 |
| Toluene | 200 |
| Methyl ethyl ketone | 200 |
| Phenol resin | 10 |

The above composition was mixed to obtain finish coat M.

Finish Coat N:

To the above-mentioned finish coat M were added 5 parts of formic acid.

In Comparative Example 8, molding 1 described above was adhered to body 7 using double-coated tape 563 (commercial product made by Nitto Denko Industry).

As is evident from Table 1, the adhesive force between molding 1 and sponge 4 according to the examples is markedly improved as compared to convetional double-coated tapes. Accordingly, no stripping of molding 1 occurs at the surface between molding 1 and the adhesive (showing primer 2 and finish coat 3).

Further, molding 1 can be adhered to body 7 by the use of inexpensive single-coated tape 6 for molding 1 coated with the above-described adhesives 2 and 3 without using any expensive double-coated tape and therefore, production costs can be greatly reduced.

Next, the present invention will be explained with reference to a second example of the present invention embodied on the structure for mounting a side protector molding on a body of an automobile, with respect to points different from the first example.

Primer 2 in the second example is obtained by mixing 100 parts of chloroprene rubber with 10 to 500 parts of a polymethacrylic acid derivative and/or a polyacrylic acid derivative. Also in this example, with greater than 500 parts, primer 2 becomes hard and rather fragile; with less than 10 parts, primer 2 cannot exhibit its effect and provides a poor adhesive force. Specifically, the components are mixed in the following parts by weight.

| | |
|---|---|
| Chloroprene rubber | 100 |
| Polymethyl methacrylate | 50 |
| Toluene | 2425 |
| n-Hexane | 2425 |

Examples of the polymethacrylic acid derivatives and/or the polyacrylic acid derivatives used as the mixtures thereof include, in addition to polymethyl methacrylate used in this example, polymethacrylic acid, polyethyl methacrylate, polypropyl methacrylate, polyacrylic acid, polymethyl acrylate, polyethyl acrylate, polypropyl acrylate, etc.

Further in order to confirm the effect of this example, the following test was performed. Namely, primer 2 of this example was coated onto test pieces comprising the same compound as in molding 1 described above. After air-drying the test pieces at room temperature for 30 minutes, finish coat 3 of Example 1 described above was further coated thereon followed by air-drying at room temperature for 30 minutes likewise. Thereafter, the test pieces were laminated on each other. After allowing to stand for 3 days at room temperature, a shearing test was performed at a tensile speed of 30 mm/min.

The results are shown in Table 2.

TABLE 2

| | Shear Strength (kg/18 mm$^2$) |
|---|---|
| Second Example | 17.9 |
| Third Example | 18.0 |
| Comparative Example 9 | 3.1 |
| Comparative Example 10 | 0.7 |

In the third example, a mixture having the following parts by weight of components was used as finish coat 3 for primer 2 of the second example described above.

| | |
|---|---|
| Chloroprene rubber | 100 |
| Tris(p-isocyanato-phenyl) thiophosphate | 20 |
| Toluene | 150 |
| Methyl ethyl ketone | 150 |
| Methylene chloride | 80 |

In Comparative Example 9, no primer 2 was coated but Cemedine 210 (chloroprene rubber type adhesive, adhesive made by Cemedine Co., Ltd.) was used as finish coat 3.

In Comparative Example 10, primer 2 of the second example was used and a 15% toluene solution of chloroprene rubber was used as finish coat 3.

According to this example, the adhesive force between molding 1 and sponge 4 is markedly improved as is evident from Table 2. Accordingly, no stripping of molding 1 occurs at the interface between molding 1 and the adhesives (primer 2 and finish coat 3).

Further molding 1 can be adhered to body 7 by the use of inexpensive single-coated tape 6 for molding 1 coated with the above-mentioned adhesives 2 and 3, without using expensive double-coated tape and therefore, production costs can be greatly reduced.

The present invention is not deemed to be limited to the first to third examples but can be embodied as follows.

(1) Methods for coating primer 2 and finish coat 3 described above may be any of brush coating, dip coating, spray coating and the like and are not limited thereto.

(2) As sponge 4 described above, sponge made of polyethylene, chloroprene rubber, etc., in addition to acryl rubber used in the above-described examples, unwoven cloth, films, paper, etc. may also be used.

(3) As adhesive 5 described above, chloroprene rubber (CR), nitrile rubber (NBR), natural rubber (NR), styrene butadiene rubber (SBR), etc. of rubber type may also be used, in addition to acryl rubber used in the above examples.

(4) In case that a strong adhesive force is not required or in case that the molding is made of urethane, ethylene-vinyl acetate copolymers, primer 2 is not necessarily required.

(5) The present invention may also be embodied on general decoration moldings for domestic use such as golden brades, color moldings, etc., in addition to side moldings for automobiles in the above examples.

Next, the present invention will be explained with reference to a fourth example which embodies a structure for mounting the molding on a body of an automobile.

In the fourth example, an adhesive comprising a primer and a finish coat described below in detail is coated between the sponge and the molding, which is provided for use.

First, the primer comprises mixtures of chloroprene rubber and polymers of methacrylic acid derivatives and/or acrylic acid derivatives or polymers of the monomers.

Specific examples of the polymers of the methacrylic acid derivatives include polymethacrylic acid, polymethyl methacrylate, polyethyl methacrylate, polypropyl methacrylate, etc. Typical examples of the polymers of the acrylic acid derivatives include polyacrylic acid, polymethyl acrylate, polyethyl acrylate, polypropyl acrylate, etc.

Specific examples of the monomers of the methacrylic acid derivatives include methyl methacrylate, ethyl methacrylate, propyl methacrylate, butyl methacrylate, etc. Specific examples of the monomers of the acrylic acid derivatives include methyl acrylate, ethyl acrylate, propyl acrylate, butyl acrylate, etc.

In compounding these polymers or monomers in chloroprene rubber, it is preferred to formulate 5 to 500 parts by weight based on 100 parts by weight of chloroprene rubber.

With less than 5 parts by weight, no adhesive effect is exhibited; with greater than 500 parts by weight, hardness becomes high and rather fragile.

Hereafter specific examples for compounding the primer are shown (wherein parts are all by weight).
Primer 1:
 Chloroprene rubber, 100 parts, 50 parts of polymethyl methacrylate, and as solvents, 2425 parts of toluene and 2425 parts of n-hexane were mixed to prepare a primer.
Primer 2:
 Chloroprene rubber, 100 parts, 600 parts of polymethyl acrylate, and as solvents, 12000 parts of toluene and 12000 parts of n-hexane were mixed to prepare a primer.
Primer 3:
 Chloroprene rubber, 100 parts, 100 parts of methyl methacrylate, as a polymerization catalyst 0.5 parts of benzoyl peroxide (BPO) and as solvents, 2500 parts of toluene and 2500 parts of n-hexane were mixed. The mixture was polymerized at 80° C. for 8 hours to prepare a primer.
Primer 4:
 Chloroprene rubber, 100 parts, 500 parts of ethyl methacrylate, 0.5 parts of BPO and as solvents, 10000 parts of toluene and 10000 parts of n-hexane were mixed. The mixture was polymerized at 80° C. for 8 hours to prepare a primer.

Next, specific examples of the polyurethane type compositions used as finish coats are polyester type polyurethanes containing isocyanate groups at the terminals and further mixtures of polyester type urethanes containing hydroxyl groups at the terminals and polymers of methacrylic acid derivatives and/or acrylic acid derivatives or polymers of the monomers.

More specificaly, the polyester type polyurethanes containing isocyanate groups at the terminals thereof are polyesters consisting of diisocyanates, organic acids and glycols.

Examples of the diisocyanates include tolylene diisocyanate, 4,4'-diphenylmethane diisocyanate, hydrogenated 4,4'-diphenylmethane diisocyanate, 1,5-naphthalene diisocyanate, xylene diisocyanate, hydrogenated xylene diisocyanate, isophorone diisocyanate, 1,6-hexamethylene diisocyanate, etc.

Examples of the organic acids include phthalic anhydride, isophthalic acid, terephthalic acid, succinic acid, adipic acid, azelaic acid and sebacic acid.

Examples of the glycols include, ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentane-1,3-diol, hydrogenated bisphenol A, trimethylene glycol, and 2-ethyl-1,3-hexanediol.

It is preferred that the polyester type polyurethanes containing isocyanate groups at the terminals thereof or the polyester type urethanes containing hydroxyl groups at the terminals thereof have each a molecular weight in the range of 500 to 5000, more preferably 1000 to 3000.

With the molecular weight of less than 500, the finish coat is hard and fragile so that its adhesive force is reduced.

Further with greater than 5000, the finish coat is soft which results in a poor adhesive force.

Hereafter specific examples for compounding the finish coat are shown wherein parts are all by weight.

Finish Coat 1:

A mixture of 1048.76 parts of hydrogenated 4,4'-diphenylmethane diisocyanate, 2000 parts of polybutylene adipate (molecular weight: ca. 2000), 243.38 parts of 1,4-butanediol (BD) and further as solvents 6584.28 parts of toluene and 6584.28 parts of methyl ethyl ketone was polymerized at 80° C. for 3 hours in a dry nitrogen flow to prepare a finish coat.

Finish Coat 2:

A mixture of 752.76 parts of xylene diisocyanate (XDI), 2000 parts of polyethylene adipate (PEA, molecular weight: ca. 2000), 167.62 parts of ethylene glycol (EG) and further as solvents, 5840.76 parts of toluene and 5840.76 parts of methyl ethyl ketone was polymerized at 80° C. for 3 hours in a dry nitrogen flow to prepare a finish coat.

The following finish coats 3 through 16 were all obtained by reacting isocyanates and polyesters at 80° C. for 3 hours in a dry nitrogen flow, adding a chain extension agent thereto, and again reacting at 80° C. for 1 hour in a dry nitrogen flow.

The reaction was carried out by diluting with a solvent of toluene:methyl ethyl ketone=1:1 (in a weight ratio) in a solid content of the finish coat being 20%.

Finish Coat 3:

4,4'-diphenylmethane diisocyanate (MDI), 100 parts; polyethylene adipate (PEA) having a molecular weight of 400, 53.26 parts; ethylene glycol (EG) as a chain extension agent, 14.05 parts.

Finish Coat 4:

MDI, 100 parts; polybutylene adipate (PBA) having a molecular weight of 500, 66.56 parts; 1,4-butanediol (BD), 20.40 parts.

Finish Coat 5:

MDI, 100 parts; polyethylene butylene adipate (PEBA) having a molecular weight of 2000, 266.31 parts; 1,6-hexanediol, 26.76 parts.

Finish Coat 6:

MDI, 100 parts; PEA (molecular weight 5000), 665.78 parts; EG, 14.05 parts.

Finish Coat 7:

MDI, 100 parts; PBA (molecular weight 6000), 798.93 parts; BD, 20.40 parts.

Finish Coat 8:

xylene diisocyanate (XDI), 100 parts; PEA (molecular weight 1000), 191.94 parts; EG, 44.09 parts.

Finish Coat 9:

XDI, 100 parts; PEA (molecular weight 2000), 383.88 parts; EG, 44.09 parts.

Finish Coat 10:

hydrogenated MDI, 100 parts; polyethylene azelate (molecular weight 1000), 127.06 parts; EG, 29.2 parts.

Finish Coat 11:

1,6-hexamethylene diisocyanate, 100 parts; polyethylene sebacate (molecular weight 1000), 99.1 parts; EG, 28.92 parts.

Finish Coat 12:

MDI, 100 parts; PEA (molecular weight 1000), 266.31 parts; EG, 5.79 parts.

Finish Coat 13:

MDI, 100 parts; PEA (molecular weight 1000), 199.8 parts; EG, 10.54 parts.

Finish Coat 14:

MDI, 100 parts; PEA (molecular weight 1000), 299.7 parts; EG, 0.69 parts.

Finish Coat 15:

MDI, 100 parts; PEA (molecular weight 1000), 159.87 parts; EG, 13.4 parts.

Finish Coat 16:

MDI, 100 parts; PEA (molecular weight 1000), 133.16 parts; EG, 15.29 parts.

Next, specific examples for compounding the finish coat comprising mixtures of polyester type urethanes containing hydroxyl groups at the terminals thereof and polymers of methacrylic acid derivatives and/or acrylic acid derivatives or polymers of the monomers are shown below.

The following finish coats 17 and 18 were prepared by reacting isocyanates and polyesters at 80° C. for 3 hours in a dry nitrogen flow, adding a chain extension agent thereto and again reacting at 80° C. for 1 hour in a dry nitrogen flow, and then adding polymethyl methacrylate thereto.

Finish Coat 17:

A mixture of 2000 parts of PEA (molecular weight, ca. 2000), 198.31 parts of BD, 750.78 parts of MDI, 1224.29 parts of polymethyl methacrylate (PMMA) and further as solvents, 7345.72 parts each of toluene and methyl ethyl ketone was mixed to prepare a finish coat.

Finish Coat 18:

A mixture of 2000 parts of PBA (molecular weight, ca. 2000), 130.37 parts of EG, 786.57 parts of hydrogenated MDI, 2392.56 parts of PMMA and further as solvents, 2392.56 parts each of toluene and methyl ethyl ketone was mixed to prepare a finish coat.

Further finish coats 19 through 28 were prepared by reacting isocyanates and polyesters at 80° C. for 3 hours in a dry nitrogen flow, adding a chain extension agent thereto and again reacting at 80° C. for 1 hour in a dry nitrogen flow, then adding methacrylic acid derivatives or acrylic acid derivatives and as a polymerization catalyst benzoyl peroxide (BPO) thereto and polymerizing the mixture at 80° C. for 8 hours.

The polymerization was carried out by diluting the mixture with a solvent of toluene:methyl ethyl ketone=1:1 (in a weight ratio) in a solid content of the finish coat being 20%.

Finish Coat 19:

MDI, 100 parts; PEA (molecular weight 400), 53.26 parts; EG, 18.19 parts; methyl methacrylate (MMA), 171.42 parts.

Finish Coat 20:

MDI, 100 parts; PBA (molecular weight 500), 66.58 parts; BD, 26.41 parts; ethyl methacrylate (EMA), 192.95 parts.

Finish Coat 21:

MDI, 100 parts; PEBA (molecular weight 2000), 266.31 parts; 1,6-hexanediol, 34.63 parts; MMA, 400.91 parts.

Finish Coat 22:

MDI, 100 parts; PEA (molecular weight 5000), 665.78 parts; EG, 18.19 parts; methyl acrylate (MA), 783.94 parts.

Finish Coat 23:

MDI, 100 parts; PBA (molecular weight 6000), 798.93 parts; BD, 26.41 parts; ethyl acrylate (EA), 925.31 parts.

Finish Coat 24:

MDI, 100 parts; PEBA (molecular weight 2000), 266.31 parts; EG, 26.41 parts.

Finish Coat 25:

MDI, 100 parts; PBA (molecular weight 1000), 99.9 parts; BD, 28.82 parts; MMA, 11.44 parts.

Finish Coat 26:

MDI, 100 parts; PBA (molecular weight 3000), 239.81 parts; EG, 20.84 parts; EMA, 1082.02 parts.

Finish Coat 27:

XD, 100 parts; PEA (molecular weight 2000), 177.15 parts; EG, 28.59 parts; MMA, 1528.77 parts.

Finish Coat 28:

MDI, 100 parts; PEBA (molecular weight 2000), 266.31 parts; EG, 18.19 parts; MMA, 2306.81 parts.

Further finish coats 29 through 33 were prepared by reacting isocyanates and polyesters at 80° C. for 3 hours in a dry nitrogen flow, then adding methacrylic acid derivatives or acrylic acid derivatives and as a polymerization catalyst 0.01 part of benzoyl peroxide (BPO) thereto based on 100 parts of the polyester type urethanes and polymerizing the mixture at 80° C. for 8 hours. The polymerization was also carried out by diluting the mixture with a solvent of toluene:methyl ethyl ketone =1:1 (in a weight ratio) in a solid content of the finish coat being 20%.

Finish Coat 29:

MDI, 100 parts; PEA (molecular weight, 3000), 1498.5 parts; compounded material of MMA/EMA=1/2, 799.25 parts.

Finish Coat 30:

MDI, 100 parts; PEA (molecular weight, 2000), 959.23 parts; compounded material of MMA/EMA=1/1, 1059.23 parts.

Finish Coat 31:

MDI, 100 parts; PEA (molecular weight, 1000), 461.74 parts; compounded material of MMA/EMA=2/1, 1132.03 parts.

Finish Coat 32:

MDI, 100 parts; PEA (molecular weight, 1000), 456.62 parts; MA, 1669.83 parts.

Finish Coat 33:

MDI, 100 parts; PEA (molecular weight, 1000), 449.55 parts; EA, 1648.66 parts.

Next, in order to demonstrate the effect of the adhesive comprising each of the primers and each of the finish coats described above, the following test was performed.

Method:

As test pieaces, moldings made of vinyl chloride were used. A primer was coated on the back surface of the molding. After air-drying at room temperature for 30 minutes, a finish coat was applied thereon followed by air-drying for further 30 minutes at room temperature.

Two of the test pieces were laminated on each other so as to place each of the finish coats in a face-to-face relation. After allowing to stand for 3 days at room temperature, a shear test was carried out at a tensile speed of 30 mm/min.

The moldings used as the test pieces were prepared by extrusion molding at 170° C. a vinyl chloride resin having the following composition:

| | |
|---|---|
| Polyvinyl chloride (polymerization degree: 1450) | 100 parts |
| Dioctyl phthalate (DOP) | 80 parts |
| Epoxylated soybean oil | 3 parts |
| Stabilizer | 4.5 parts |

The test was carried out in appropriate combinations of the primers and the finish coats. The results are shown in Tables 3 to 6.

TABLE 3

| Test Example | Primer | Finish Coat | Shear Strength |
|---|---|---|---|
| 1 | 1 | 1 | 22.8 |
| 2 | 1 | 2 | 23.4 |
| 3 | 3 | 4 | 18.3 |
| 4 | 3 | 5 | 20.1 |
| 5 | 3 | 6 | 18.5 |
| 6 | 3 | 8 | 19.9 |
| 7 | 3 | 9 | 18.3 |
| 8 | 4 | 10 | 20.9 |
| 9 | 4 | 11 | 19.0 |
| 10 | 3 | 12 | 20.5 |
| 11 | 3 | 13 | 21.5 |
| 12 | 3 | 14 | 20.0 |
| 13 | 3 | 15 | 22.3 |
| 14 | 3 | 16 | 23.6 |

(Shear Strength: kg/18 mm²)

TABLE 4

| Comparative Example | Primer | Finish Coat | Shear Strength |
|---|---|---|---|
| 1 | 2 | 5 | 6.2 |
| 2 | 2 | 8 | 4.3 |
| 3 | 2 | 10 | 6.5 |
| 4 | 3 | 3 | 6.0 |
| 5 | 3 | 7 | 5.1 |

(Shear Strength: kg/18 mm²)

TABLE 5

| Comparative Example | Primer | Finish Coat | Shear Strength |
|---|---|---|---|
| 6 | 2 | 21 | 4.5 |
| 7 | 3 | 19 | 3.5 |
| 8 | 3 | 23 | 5.4 |
| 9 | 3 | 24 | 6.3 |
| 10 | 3 | 28 | 5.9 |

(Shear Strength: kg/18 mm²)

TABLE 6

| Test Example | Primer | Finish Coat | Shear Strength |
|---|---|---|---|
| 15 | 1 | 17 | 20.5 |
| 16 | 1 | 18 | 22.0 |
| 17 | 3 | 20 | 17.6 |
| 18 | 3 | 21 | 22.0 |
| 19 | 3 | 22 | 18.7 |
| 20 | 3 | 25 | 14.5 |
| 21 | 3 | 26 | 20.1 |
| 22 | 3 | 27 | 19.8 |

TABLE 6-continued

| Test Example | Primer | Finish Coat | Shear Strength |
|---|---|---|---|
| 23 | 3 | 29 | 17.5 |
| 24 | 3 | 30 | 19.4 |
| 25 | 3 | 31 | 20.0 |
| 26 | 3 | 32 | 21.3 |
| 27 | 3 | 33 | 22.0 |
| 28 | 4 | 21 | 17.6 |
| 29 | 4 | 26 | 16.4 |
| 30 | 4 | 27 | 15.0 |

(Shear Strength: kg/18 mm$^2$)

According to the test results, the shear strength of the adhesive comprising the primer and the finishi coat in each of the test example was satisfactory for use of the structure for mounting the vinyl chloride-made molding on a body of an automobile.

The primers used in Comparative Examples 1 to 3 and 6 contain more than 500 parts of PMMA based on 100 parts of chloroprene rubber and, in the finish coats used in Comparative Examples 4 and 5, the molecular weight of the polyester type polyurethane containing isocyanate groups at the terminals thereof and the molecular weight of the polyester type urethane containing hydroxyl groups at the terminals thereof in the finish coats used in Comparative Examples 7 and 8 are each outside the range of 500 to 5000.

Further, neither acrylic acid derivative nor methacrylic acid derivative is compounded in the finish coat in Comparative Example 9. In Comparative Example 10, MMA is compounded in an excess amount.

From the foregoing reasons, the shear strength in each of the comparative examples was considerably lower than that in each of the test examples.

The adhesives comprising the primers and the finish coats in the test examples described above are not limited to the use of the aforesaid structures for mounting moldings but can also be embodied upon generally mounting synthetic resin materials on metals and other materials to be mounted.

While it is not directly related to the present invention, the primer may be omitted but the finish coat alone may be used in case that a strong adhesive force is not required or in case that moldings are comprised of urethane or ethylene vinyl acetate copolymers.

It is apparent that a wide variety of embodiments may be constructed without departing from the spirit and scope of the present invention and therefore, the present invention is not deemed to be limited to specific embodiments other than those restricted to the appended claims.

What is claimed is:

1. A structure for mounting a molding comprising:
   (a) a body to be mounted,
   (b) a resin molding to be adhered to said body via a sponge,
   (c) a primer applied between said resin molding and sponge, said primer comprising a mixture of chloroprene rubber and a polymer of a methacrylic acid derivative and/or an acrylic acid derivative or a polymer of said monomer, and,
   (d) a finish coat applied on the surface of said primer.

2. A structure for mounting a molding according to claim 1 wherein said primer is obtained by compounding 5 to 500 parts by weight of a polymer of or a monomer of a methacrylic acid derivative and/or an acrylic acid derivative in 100 parts by weight of chloroprene rubber.

3. A structure for mounting a molding according to claim 1 wherein said finish coat is a mixture of chloroprene rubber and a polyisocyanate.

4. A structure for mounting a molding according to claim 3 wherein said finish coat is obtained by incorporating 0.5 to 50 parts by weight of said polyisocyanate in 100 parts by weight of chloroprene rubber.

5. A structure for mounting a molding according to claim 1 wherein said finish coat comprises a polyurethane type composition.

6. A structure for mounting a molding according to claim 5 wherein said polyurethane type composition is a polyester type polyurethane containing isocyanate groups at the terminals thereof.

7. A structure for mounting a molding according to claim 5 wherein said polyurethane type composition is a mixture of a polyester type urethane containing hydroxyl groups at the terminals thereof and a plymer of a methacrylic acid derivative and/or an acrylic acid derivative or a polymer of said monomer.

8. A structure for mounting a molding according to claim 7 wherein said polyurethane type composition is obtained by compounding 5 to 500 parts by weight of a polymer of or a monomer of a methacrylic acid derivative and/or an acrylic acid derivative in 100 parts by weight of the polyester type urethane containing hydroxyl groups at the terminals thereof.

* * * * *